(12) United States Patent
Granshaw et al.

(10) Patent No.: US 10,218,661 B2
(45) Date of Patent: *Feb. 26, 2019

(54) DYNAMIC GRANULAR MESSAGING PERSISTENCE

(71) Applicant: International Business Machines Corporation, Armonk, NY (US)

(72) Inventors: David Granshaw, Eastleigh (GB); Sam T. Massey, Southampton (GB); Daniel McGinnes, Southampton (GB); Martin Ross, Winchester (GB); Richard Schofield, Eastleigh (GB); Craig Stirling, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/674,517

(22) Filed: Aug. 11, 2017

(65) Prior Publication Data

US 2017/0346778 A1  Nov. 30, 2017

Related U.S. Application Data

(63) Continuation of application No. 14/991,903, filed on Jan. 8, 2016, now Pat. No. 9,736,103, which is a
(Continued)

(51) Int. Cl.
*G06F 15/16* (2006.01)
*H04L 12/58* (2006.01)
*G06Q 10/10* (2012.01)

(52) U.S. Cl.
CPC .......... *H04L 51/26* (2013.01); *G06Q 10/107* (2013.01); *H04L 51/00* (2013.01); *H04L 51/34* (2013.01)

(58) Field of Classification Search
CPC .... H04L 12/5885; H04L 12/58; G06Q 10/107
See application file for complete search history.

(56) References Cited

U.S. PATENT DOCUMENTS 5,506,966 A   4/1996  Ban
5,604,869 A   2/1997  Mincher
(Continued)

OTHER PUBLICATIONS

Hughson et al. "Final MO and Message Broker Performance Boot camp: WebSphere MO & Message Broker." IBM Hursley, Mar. 3, 2011.
(Continued)

*Primary Examiner* — Hieu T Hoang
(74) *Attorney, Agent, or Firm* — Steven M. Greenberg, Esq.; Shutts & Bowen LLP

(57) ABSTRACT

Embodiments of the present invention provide a method, system and computer program product for dynamic, granular messaging persistence in a messaging system. In an embodiment of the invention, a method for dynamic, granular messaging persistence in a messaging system is provided. The method includes monitoring operational performance of a message broker and receiving a message for queuing in a message queue of the message broker. The method also includes parsing the message to extract different fields and corresponding priorities and selectively storing in fixed storage, data for corresponding ones of the different fields based upon consideration of corresponding ones of the priorities and the monitored operational performance. Finally, the method includes queuing the message in the message queue.

20 Claims, 1 Drawing Sheet

Related U.S. Application Data continuation of application No. 13/688,378, filed on Nov. 29, 2012, now Pat. No. 9,258,263.

(56) References Cited

U.S. PATENT DOCUMENTS

| | | |
|---|---|---|
| 5,617,541 A | 4/1997 | Albanese |
| 5,940,390 A | 8/1999 | Berl |
| 6,650,619 B1 | 11/2003 | Schuster |
| 6,847,989 B1 | 1/2005 | Chastain et al. |
| 7,039,671 B2 | 5/2006 | Cullen |
| 7,448,043 B2 | 11/2008 | Shenfield |
| 7,698,369 B2 | 4/2010 | Addante et al. |
| 8,144,714 B1 | 3/2012 | Buchko |
| 8,146,095 B2 | 3/2012 | Gale et al. |
| 8,370,847 B2 | 2/2013 | Bedi et al. |
| 8,775,519 B2 | 7/2014 | Smith et al. |
| 8,825,964 B1 | 9/2014 | Sopka |
| 2003/0188021 A1 | 10/2003 | Challenger |
| 2007/0064703 A1 | 3/2007 | Hernandez et al. |
| 2007/0079379 A1 | 4/2007 | Sprosts |
| 2007/0156833 A1 | 7/2007 | Nikolov |
| 2007/0283194 A1 | 12/2007 | Villella |
| 2008/0127208 A1 | 5/2008 | Bedi et al. |
| 2008/0133541 A1 | 6/2008 | Fletcher |
| 2010/0017441 A1 | 1/2010 | Todd |
| 2012/0131108 A1 | 5/2012 | Barsness et al. |
| 2013/0060834 A1 | 3/2013 | Paramasivam et al. |

OTHER PUBLICATIONS

Lazarevic, Aleksandar. "Probabilistic Grid Scheduling Based on Job Statistics and Monitoring Information." University College London, London, England 2005.

DYNAMIC GRANULAR MESSAGING PERSISTENCE

CROSS-REFERENCE TO RELATED APPLICATIONS

This application is a Continuation of U.S. patent application Ser. No. 14/991,903, filed Jan. 8, 2016, which is a Continuation of U.S. patent application Ser. No. 13/688,378, filed Nov. 29, 2012, the entirety of each which is incorporated herein by reference.

BACKGROUND OF THE INVENTION

Field of the Invention

The present invention relates to the field of messaging and more particularly to message queue management in a messaging system.

Description of the Related Art

In the field of information technology, messaging refers to the exchange of information between two computing processes. A message can be something as simple as just a few bits of data, or something as robust as an electronic mail message containing embedded multimedia imagery. In its simplest form, a messaging system acts to directly exchange messages between messaging partners. Inter-process communications methods facilitate message passing between processes in a computer communications network. E-mail messaging systems rely upon messaging servers both to transmit and receive messages onto a network, and instant messaging systems moderate and facilitate the exchange of instantaneous messages between chat partners.

Message queues provide an asynchronous mode of message passing between processes. In a message queuing system, applications can submit messages to a queue for delivery to subscribing clients who can consume the messages in the queue at a later time. To the extent that a uniform message structure can be agreed upon between message provider and message consumer, a message queue can provide an ideal solution for disparate applications seeking to communicate without requiring internal codification for compatibility with one another.

Modern message queuing systems account for the possibility of the failure of supporting infrastructure such as network communications loss, server crashes and the like. In this regard, current messaging systems enable a delivery model to be specified such that messages that contain critical data are persisted to disk or other forms of reliable storage, such that the message can be recovered and processed following machine reboots and application failures/shutdown. Some messaging systems extend this concept further and provide a message reliability level to provide a finer grained control on the quality of service provided.

Persisting messages to fixed storage during message queuing, though, can become taxing on the underlying computing infrastructure. Specifically, for a high volume message queue, significant disk storage will be required to persist all affected messages. Further, the act of persisting, retrieving and intelligently purging messages so as to account for the possibility of an infrastructure failure can be time consuming resulting in performance delays. Thus, as the reliability level of a messaging system increases based upon message persistence, processing overhead placed upon the messaging system increases resulting in a reduction in system performance.

BRIEF SUMMARY OF THE INVENTION

Embodiments of the present invention address deficiencies of the art in respect to message persistence in a messaging system and provide a novel and non-obvious method, system and computer program product for dynamic, granular messaging persistence in a messaging system. In an embodiment of the invention, a method for dynamic, granular messaging persistence in a messaging system is provided. The method includes monitoring operational performance of a message broker and receiving a message for queuing in a message queue of the message broker. The method also includes parsing the message to extract different fields and associating these fields with a corresponding priority, either via a message schema or from data contained within the message, and selectively storing in fixed storage, data for corresponding ones of the different fields based upon consideration of corresponding ones of the priorities and the monitored operational performance. Finally, the method includes queuing the message in the message queue.

In one aspect of the embodiment, the operational performance indicates a degree of resource utilization in a host server hosting the message broker. As such, at least one of the priorities can indicate that data in a corresponding one of the fields is to be persisted in the fixed storage in response to detecting a low degree of resource utilization, but that data in a corresponding one of the fields is not to be persisted in the fixed storage in response to detecting a high degree of resource utilization. Also, at least one of the priorities can indicate that data in a corresponding one of the fields is to be persisted irrespective of a degree of utilization detected for the host server. Further, at least one of the priorities can indicate that data in a corresponding one of the fields is never to be persisted irrespective of a degree of utilization detected for the host server.

In another embodiment of the invention, a message data processing system can be configured for dynamic, granular messaging persistence. The system can include a host server communicatively linked to client servers over a computer communications network and also fixed storage. The system also can include a message broker executing in memory of the host server and brokering messages in a message queue for the client servers. Finally, the system can include a granular message persistence module coupled to the host server. The module can include program code enabled to monitor operational performance of the message broker, parse a message received for queuing by the message broker in the message queue to extract different fields, associate these fields with corresponding priorities, and selectively store in the fixed storage data for corresponding ones of the different fields based upon consideration of corresponding ones of the priorities and the monitored operational performance.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for dynamic, granular messaging persistence in a messaging system. In accordance with an embodiment of the invention, messages from message publishers can be queued in a message queue for retrieval by different message consumers. Different messages provided for message queuing in the message queue can be inspected to determine fields of the different messages marked for selective persistence. Thereafter, marked portions of the different messages can be queued according to a measured performance of the messaging system. Specifically, during periods of time when the measured performance of the messaging system is high, both low and high priority fields of the messages can be persisted, while during periods of low performance, only high priority fields of the messages can be persisted. In this way, the goal of accounting for a potential failure in infrastructure of the messaging system can be balanced with the requirement not to overtax the resources of the messaging system.

Figure 1:
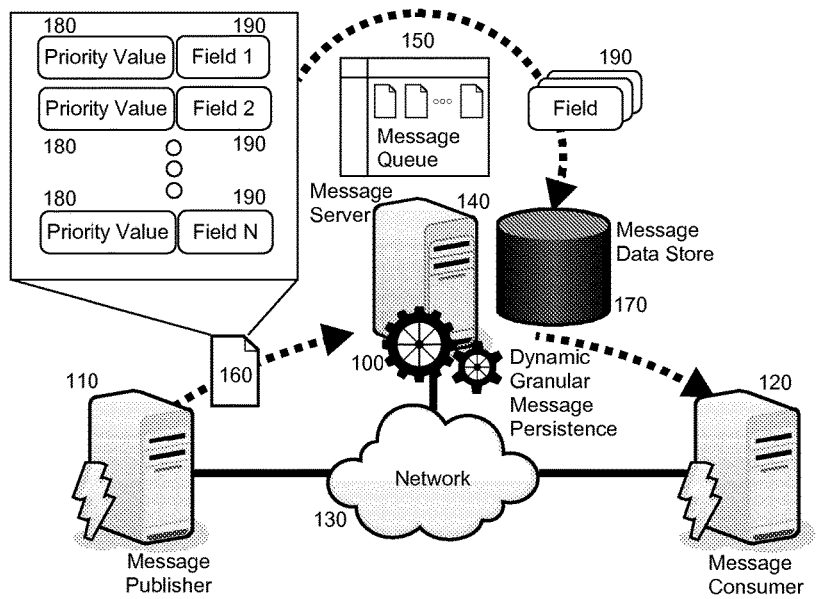
FIG. 1 is a pictorial illustration of a process for dynamic, granular messaging persistence in a messaging system.

In further illustration, FIG. 1 is a pictorial illustration of a process for dynamic, granular messaging persistence in a messaging system. As shown in FIG. 1, a message publisher 110 can publish a message 160 to a message queue 150 of a message server 140 over a computer communications network 130. A message consumer 120 in turn can retrieve the message 160 from the message queue 150 from over the computer communications network 130. The message server 140 can be coupled not only to the message queue 150, but also a message data store 170 into which message data can be stored into fixed storage the persists even subsequent to a reset or power cycle condition in the message server 140. Further, dynamic granular message persistence logic 100 can execute in memory of the message server 140. The logic 100 can be enabled to process priority value 180 indicated within the message 160, or in the alternative in a schema established for the message 160, and the corresponding message fields 190 from the message 160 in order to determine whether or not to persist data in each of the fields 190 to the message data store 170.

In this regard, the message 160 can include different data fields 190. Each of the data fields 190 can include a corresponding priority 180 indicated within the message 160, or in the alternative, within a schema defined for the message 160. The priority 180 can indicate under which circumstance data encapsulated by a corresponding one of the data fields 190 is to be persisted in the message data store 170 concurrently with the placement of the message 160 in the message queue 150. For example, the priority 180 can provide that under periods of high resource utilization in the message server 140, data in a corresponding one of the data fields 190 is not persisted to the message data store 170, but under periods of low resource utilization in the message server 140, data in a corresponding one of the data fields 190 is to be persisted to the message data store 170. Alternatively, the priority 180 can provide that data in a corresponding one of the data fields 190 always is to be persisted to the message data store 170 irrespective of resource utilization in the message server 140, or the priority 180 can provide that data in a corresponding one of the data fields 190 is never to be persisted to the message data store 170 irrespective of resource utilization in the message server 140.

Figure 2:
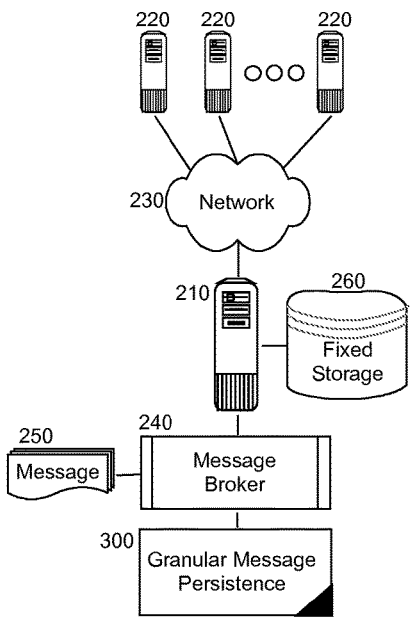
FIG. 2 is a schematic illustration of a message data processing system configured for dynamic, granular messaging persistence; and, FIG. 3 is a flow chart illustrating a process for dynamic, granular messaging persistence in a messaging system.

The process described in connection with FIG. 1 can be implemented in a message data processing system. In yet further illustration, FIG. 2 schematically shows a message data processing system configured for dynamic, granular messaging persistence. The system can include a host server 210 with memory and at least processor coupled to fixed storage 260 such as a fixed disk drive or solid state memory. The host server 210 can be communicatively linked over computer communications network 230 to different client servers 220 supporting different applications executing in memory therein. The host server 210 likewise can host in memory a message broker 240 configured to broker messages 250 from the different applications of the different client servers 220 in a message queue established in memory of the host server 210.

Notably, a granular message persistence module 300 can be coupled to the message broker 240. The module 300 can include program code that when executed in the memory of the host server 210 can be enabled to parse the content of each message 250 published to the message queue of the message broker 240 to identify different fields therein and corresponding priorities. For instance, an exemplary message format can be provided according to the following extensible markup language (XML) schema:

For example taking a simple XML Schema:

```
<xsd:schema xmlns:msg="http://www.ibm.com/mpt/
granular/" xmlns:xsd="http://www.w3.org/2001/XMLSchema" ...>
<xsd:complexType name="PolicyType">
<xsd:sequence>
<xsd:element name="name" type="xsd:string" persistence=
"msg:alwaysPersist"/>
<xsd:element name="policyNumber" type="xsd:int" persistence=
"msg:alwaysPersist"/>
<xsd:element name="address" type="xsd:string" persistence=
"msg:persistWhenResourcesPermit "/>
<xsd:element name="salary" type="xsd:string" persistence=
"msg:neverPersist"/>
<xsd:element name="renewalDate" type="xsd:decimal" persistence=
"msg:persistWhenResourcesPermit"/>
</xsd:sequence>
</xsd:complexType>
```

Thus, the priorities can be values or rules indicating under which conditions corresponding fields are to be persisted to the fixed storage 260 in addition to the message queue.

As such, the program code of the module 300 can be enabled to monitor resource utilization in the host server 210, for example processor utilization, memory utilization, disk utilization, message traffic or network bandwidth, in order to either apply the rules of the priorities, or to apply rules specified by the module 300 to the values of the priorities.

Figure 3:
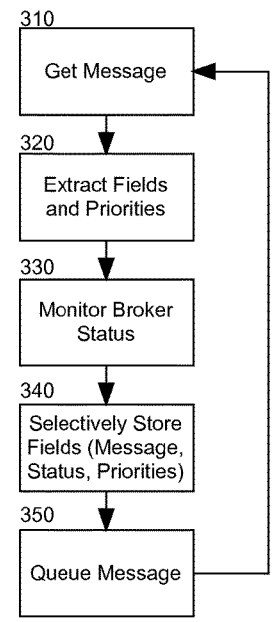

In even yet further illustration of the operation of the granular message persistence module 300, FIG. 3 is a flow chart illustrating a process for dynamic, granular messaging persistence in a messaging system. Beginning in block 310, a message can be received for queuing in a message queue of a message broker. In block 320, different fields can be extracted from the message and the corresponding priorities obtained from the message or associated schema. In block 330, the operational performance of the message broker can be monitored to determine resource utilization in the message broker. In block 340, only selected ones of the fields of the message can be persisted to fixed storage based upon an application of the priorities to the monitored operational performance. Finally, the message can be queued in the message queue.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for dynamic, granular messaging persistence in a messaging system, the method comprising:
    monitoring operational performance of a message broker executing in a memory of a host server;
    receiving a message for queuing in a message queue of the message broker;
    parsing the message to extract different fields;
    obtaining, from a schema separate from the message, corresponding priorities for the extracted different fields at least one of the priorities providing that under periods of high resource utilization in the host server, data in a corresponding one of the different fields is not persisted to a message data store, but under periods of low resource utilization in the host server, data in a corresponding one of the different fields is to be persisted to the message data store in fixed storage;
    selectively storing, in the fixed storage, data for corresponding ones of the different fields based upon consideration of corresponding ones of the priorities obtained from the schema and also the monitored operational performance; and,
    queuing the message in the message queue.

2. The method of claim 1, wherein the operational performance indicates a degree of resource utilization in a host server hosting the message broker.

3. The method of claim 2, wherein at least one of the priorities indicates that data in a corresponding one of the fields is to be persisted irrespective of a degree of utilization detected for the host server.

4. The method of claim 2, wherein at least one of the priorities indicates that data in a corresponding one of the fields is never to be persisted irrespective of a degree of utilization detected for the host server.

5. The method of claim 2, wherein the resource utilization is processor utilization.

6. The method of claim 2, wherein the resource utilization is message throughput in the message broker.

7. A message data processing system configured for dynamic, granular messaging persistence, the system comprising:
    a host server communicatively linked to client servers over a computer communications network and also fixed storage;
    a message broker executing in memory of the host server and brokering messages in a message queue for the client servers; and,
    a granular message persistence module coupled to the host server and comprising program code enabled to monitor operational performance of the message broker, parse a message received for queuing by the message broker in the message queue to extract different fields, obtain, from a schema separate from the message, corresponding priorities for the extracted different fields at least one of the priorities providing that under periods of high resource utilization in the host server, data in a corresponding one of the different fields is not persisted to a message data store, but under periods of low resource utilization in the host server, data in a corresponding one of the different fields is to be persisted to the message data store in fixed storage, and selectively store in the fixed storage data for corresponding ones of the different fields based upon consideration of corresponding ones of the priorities obtained from the schema and also the monitored operational performance.

8. The system of claim 7, wherein the operational performance indicates a degree of resource utilization in a host server hosting the message broker.

9. The system of claim 8, wherein at least one of the priorities indicates that data in a corresponding one of the fields is to be persisted in the fixed storage in response to detecting a low degree of resource utilization, but that data in a corresponding one of the fields is not to be persisted in the fixed storage in response to detecting a high degree of resource utilization.

10. The system of claim 8, wherein at least one of the priorities indicates that data in a corresponding one of the fields is to be persisted irrespective of a degree of utilization detected for the host server.

11. The system of claim 8, wherein at least one of the priorities indicates that data in a corresponding one of the fields is never to be persisted irrespective of a degree of utilization detected for the host server.

12. The system of claim 8, wherein the resource utilization is processor utilization.

13. The system of claim 8, wherein the resource utilization is message throughput in the message broker.

14. A computer program product for, the computer program product comprising:
    a non-transitory computer readable storage medium having computer readable program code embodied therewith, the computer readable program code comprising:
    computer readable program code for monitoring operational performance of a message broker;
    computer readable program code for receiving a message for queuing in a message queue of the message broker;

computer readable program code for parsing the message to extract different fields;

computer readable program code for obtaining, from a schema separate from the message, corresponding priorities for the extracted different fields at least one of the priorities providing that under periods of high resource utilization in the host server, data in a corresponding one of the different fields is not persisted to a message data store, but under periods of low resource utilization in the host server, data in a corresponding one of the different fields is to be persisted to the message data store in fixed storage;

computer readable program code for selectively storing in fixed storage, data for corresponding ones of the different fields based upon consideration of corresponding ones of the priorities obtained from the schema and also the monitored operational performance; and, computer readable program code for queuing the message in the message queue.

15. The computer program product of claim 14, wherein the operational performance indicates a degree of resource utilization in a host server hosting the message broker.

16. The computer program product of claim 15, wherein at least one of the priorities indicates that data in a corresponding one of the fields is to be persisted in the fixed storage in response to detecting a low degree of resource utilization, but that data in a corresponding one of the fields is not to be persisted in the fixed storage in response to detecting a high degree of resource utilization.

17. The computer program product of claim 15, wherein at least one of the priorities indicates that data in a corresponding one of the fields is to be persisted irrespective of a degree of utilization detected for the host server.

18. The computer program product of claim 15, wherein at least one of the priorities indicates that data in a corresponding one of the fields is never to be persisted irrespective of a degree of utilization detected for the host server.

19. The computer program product of claim 15, wherein the resource utilization is processor utilization.

20. The computer program product of claim 15, wherein the resource utilization is message throughput in the message broker.

* * * * *